United States Patent
Hummel

(10) Patent No.: US 9,467,032 B2
(45) Date of Patent: Oct. 11, 2016

(54) BRUSHLESS DC ELECTRICAL GENERATOR

(76) Inventor: Stephen N. Hummel, Austin, MN (US)

(*) Notice: Subject to any disclaimer, the term of this patent is extended or adjusted under 35 U.S.C. 154(b) by 1142 days.

(21) Appl. No.: 13/431,507

(22) Filed: Mar. 27, 2012

(65) Prior Publication Data
US 2013/0257187 A1 Oct. 3, 2013

(51) Int. Cl.
*H02K 21/12* (2006.01)
*H02K 21/44* (2006.01)

(52) U.S. Cl.
CPC .............. *H02K 21/12* (2013.01); *H02K 21/44* (2013.01)

(58) Field of Classification Search
CPC ............................... H02K 21/12; H02K 21/44
USPC ..................................................... 310/46, 48
See application file for complete search history.

(56) References Cited

U.S. PATENT DOCUMENTS

| | | | |
|---|---|---|---|
| 2,051,249 A | 8/1936 | Edwards | |
| 3,247,407 A | 4/1966 | Bruneel | |
| 3,320,454 A | 5/1967 | Kober | |
| 3,428,840 A | 2/1969 | Kober | |
| 3,869,626 A | 3/1975 | Puttock et al. | |
| 4,451,749 A | 5/1984 | Kanayama et al. | |
| 4,477,745 A | 10/1984 | Lux | |
| 5,278,624 A | 1/1994 | Kamprath et al. | |
| 5,334,899 A | 8/1994 | Skybyk | |
| 5,838,135 A * | 11/1998 | Satake et al. | 318/771 |
| 5,977,684 A | 11/1999 | Lin | |
| 7,582,998 B2 | 9/2009 | Hummel | |
| 8,253,294 B1 * | 8/2012 | Wishart | 310/115 |
| 2006/0181170 A1 | 8/2006 | Fiset | |
| 2007/0024144 A1 | 2/2007 | Obidniak | |
| 2007/0071612 A1 * | 3/2007 | Yuratich | 417/53 |
| 2008/0143194 A1 * | 6/2008 | Laughlin | 310/12 |
| 2009/0026862 A1 * | 1/2009 | Hummel | 310/126 |

* cited by examiner

*Primary Examiner* — Terrance Kenerly
(74) *Attorney, Agent, or Firm* — Winthrop & Weinstine, P.A.

(57) ABSTRACT

The present disclosure relates to an apparatus for the generation of a unidirectional electrical signal. The apparatus may include at least one magnet defining a magnetic field, a rotor disc of substantially no magnetic permeability comprising at least one magnetic field interrupter of magnetically permeable material positioned at a first radial distance from a center axis of the rotor disc, the rotor positioned so as to, upon rotation of the rotor disc, cause the at least one interruptor to pass through the magnetic field, and an electrical conductor extending across the magnetic field, whereby as the at least one interrupter passes through the magnetic field, the magnetic field is distorted by the interrupter thereby inducing a unidirectional electric signal in the conductor. The at least one magnet may be an electromagnet or a permanent magnet. The at least one magnetic field interrupter may be made of soft iron.

17 Claims, 8 Drawing Sheets

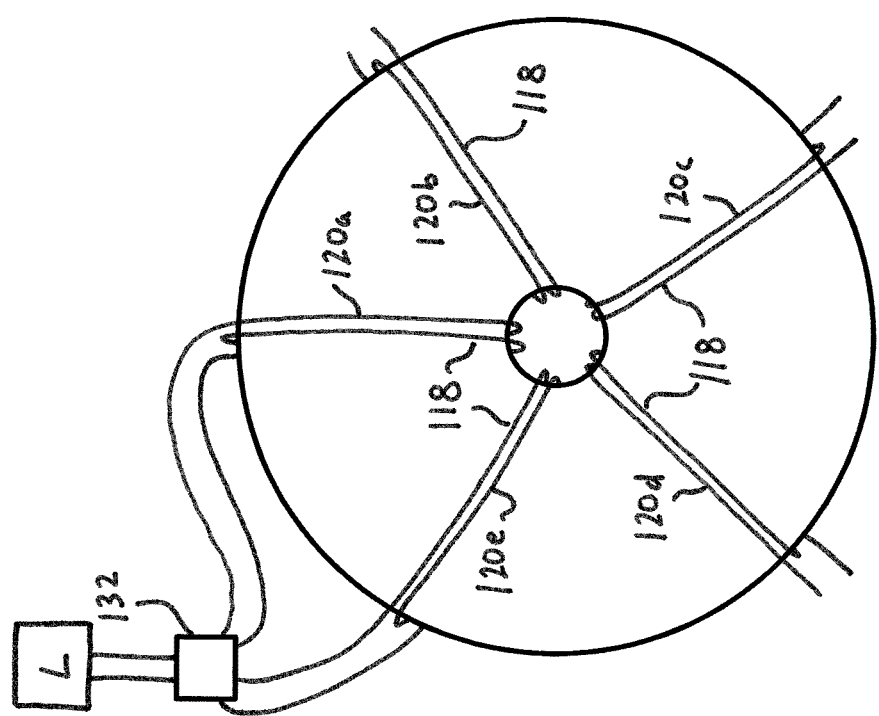

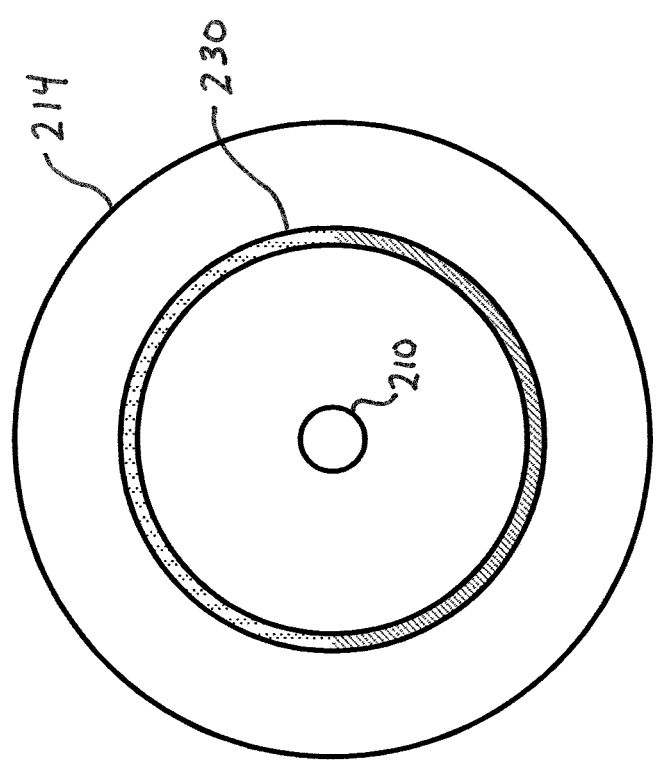

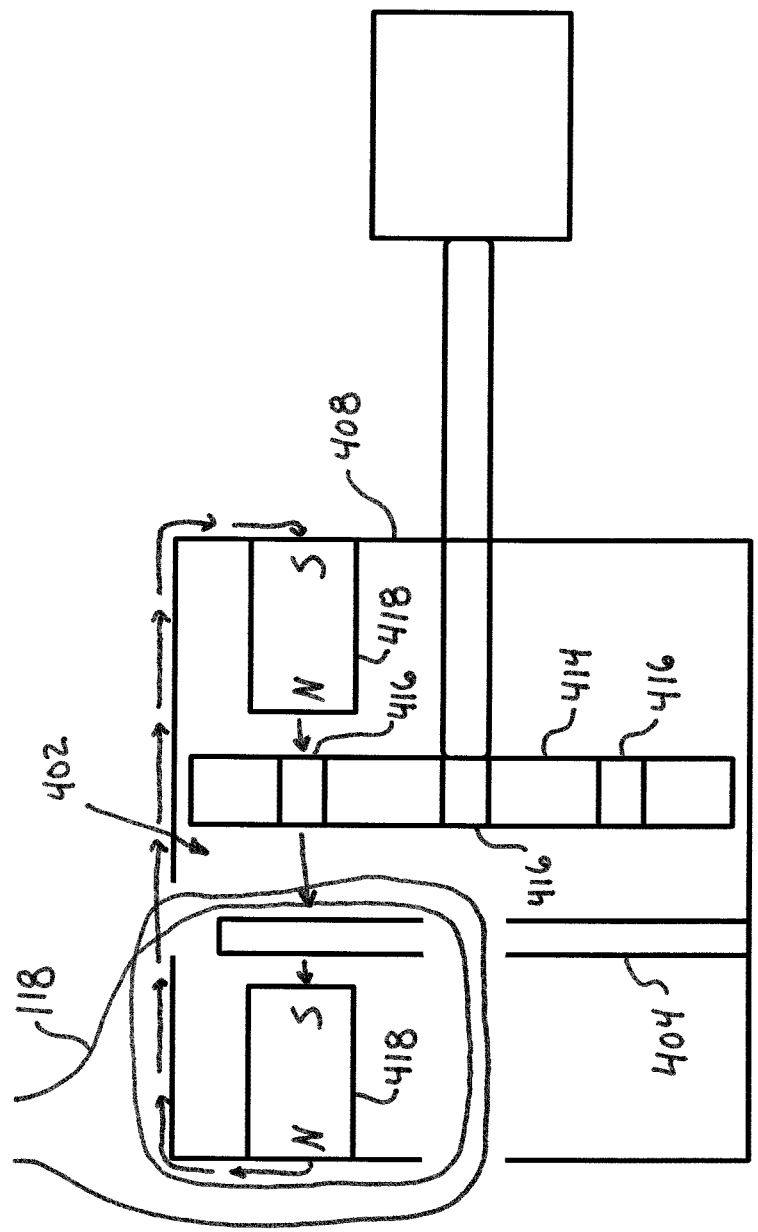

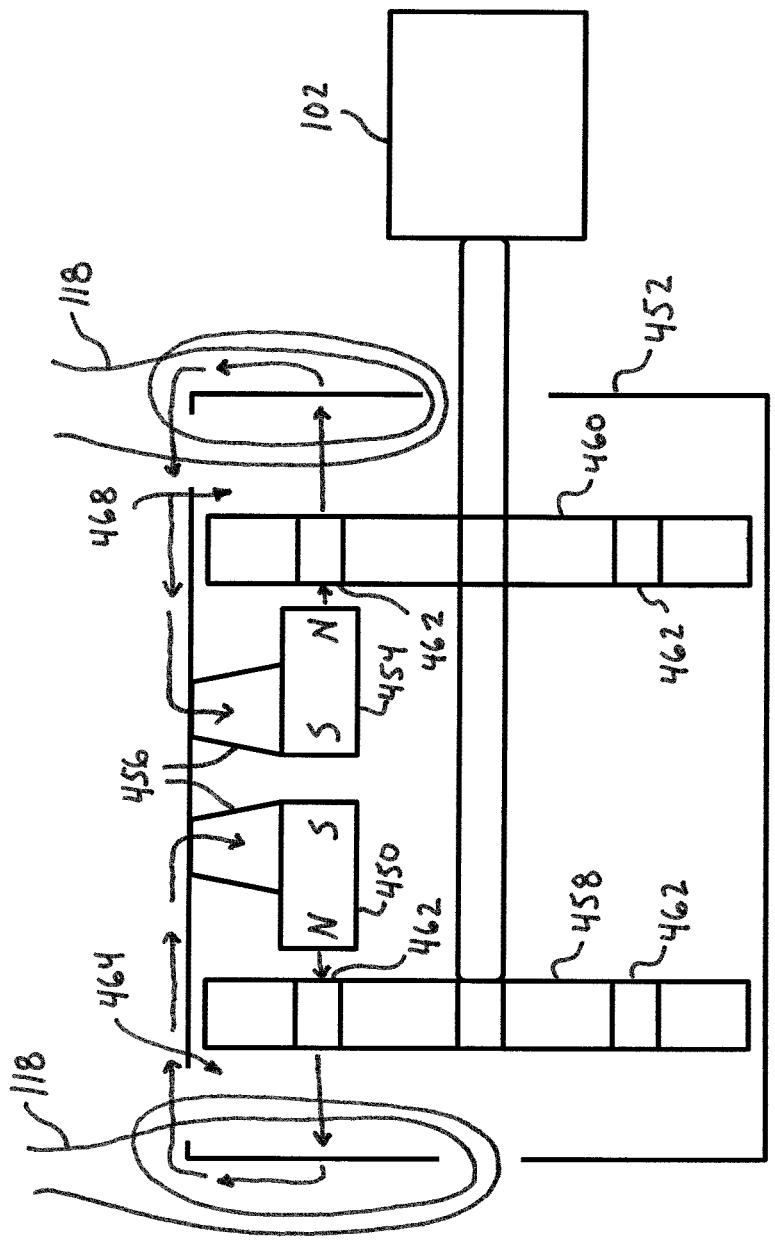

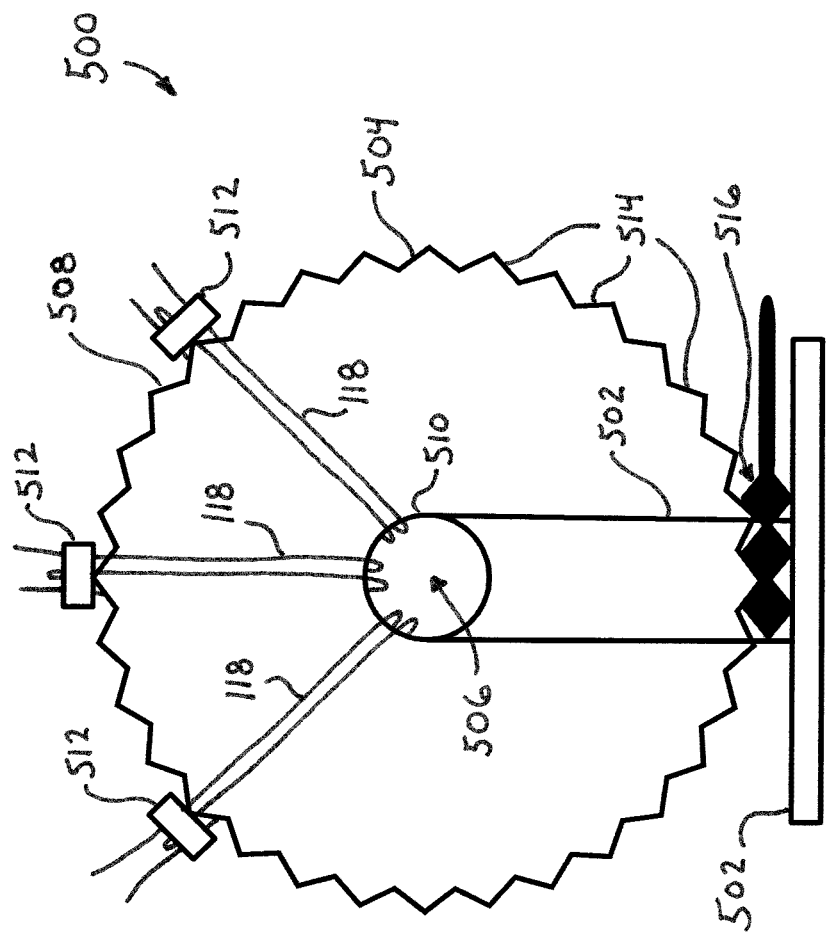

BRUSHLESS DC ELECTRICAL GENERATOR

FIELD OF THE INVENTION

This present disclosure relates to apparatus and methods for energy conversion devices. More particularly, the present disclosure relates to apparatus and methods for energy conversion devices for generating direct current ("DC") electrical signals (including alternating current ("AC") from DC signals) from a mechanical energy input (e.g., generators), without the use of brushes or other mechanical commutators. The present disclosure further relates to apparatus and methods for energy conversion devices for generating mechanical energy from an AC or DC electrical input (e.g., motors).

BACKGROUND OF THE INVENTION

Current technologies for generating DC electrical signals from mechanical, rotating machines are well-known. These devices typically include an armature winding, rotatable within a stationary magnetic field. Unfortunately, the need for a mechanical rectifier, in the form of a commutator, to convert the alternating current ("AC") electromagnetic field that is induced in each armature coil to a unidirectional voltage places such machines among the least rugged, and more expensive, classes of electric machines.

Thus, there is a need in the art for energy conversion devices without the complications presented by the prior art. There is a need in the art for improved energy conversion devices that generate DC electrical signals from a mechanical energy input, without the use of brushes or other mechanical commutators. There is also a need in the art for improved energy conversion devices that generate mechanical energy from an AC or DC electrical input.

BRIEF SUMMARY OF THE INVENTION

The present disclosure, in one embodiment, relates to an apparatus for the generation of a unidirectional electrical signal. The apparatus may include at least one magnet defining a magnetic field, a rotor disc of substantially no magnetic permeability comprising at least one magnetic field interrupter of magnetically permeable material positioned at a first radial distance from a center axis of the rotor disc, the rotor positioned so as to, upon rotation of the rotor disc, cause the at least one interruptor to pass through the magnetic field, and an electrical conductor extending across the magnetic field, whereby as the at least one interrupter passes through the magnetic field, the magnetic field is distorted by the interrupter thereby inducing a unidirectional electric signal in the conductor. The at least one magnet may be an electromagnet or a permanent magnet. The at least one magnetic field interrupter may be made of soft iron. In some embodiments, the rotor disc may include a plurality of equiangularly, circumferentially spaced apart magnetic field interrupters, which may be each oriented at a common radius from the center axis. In further embodiments, the apparatus may include a plurality of conductors, each extending across the magnetic field, whereby as the at least one interrupter passes through the magnetic field, the magnetic field is distorted by the interrupter in the area near the interrupter thereby inducing a unidirectional electric signal in the conductors. Each conductor may have a first and second lead operably connectable to a load, and at least one switch may be provided for at least one of operably connecting and disconnecting at least a subset of the conductors from a load and operably transposing connections the first and second leads of at least a subset of the conductors with a load. Still further, the apparatus may include at least one switch for operably at least one of operably connecting and disconnecting at least a subset of the conductors in series and operably connecting and disconnecting at least a subset of the conductors in parallel. In one embodiment, the plurality of conductors are arranged such that the unidirectional electric signals in the conductors are combined to create an alternating current. A frame may support the electrical conductor across the magnetic field. In some embodiments, the electrical conductor may be supported by the frame such that the conductor may be operably repositioned about a central axis of the frame. Accordingly, in some embodiments, the electrical conductor is slidingly connected with the frame via a fastener. In additional or alternative embodiments, the frame is rotatable about a central axis thereof to correspondingly reposition the electrical conductor.

The present disclosure, in another embodiment, relates to a method for creating mechanical output from an electrical signal. The method may include inducing an electrical signal through a conductor, the conductor extending near a rotor, the rotor being rotatable about an axis thereof and having a plurality of equiangularly, circumferentially spaced apart magnets, a magnetic field created by the electrical signal induced in the conductor affecting the magnets so as to cause the rotor to rotate about its axis, thereby transforming the electrical energy into rotational mechanical energy. The conductor may include a radial portion extending substantially parallel with the rotor and an axial portion extending substantially parallel with the axis of the rotor. In some embodiments, the method may include inducing an electrical signal through a plurality of conductors, each having a radial portion extending substantially parallel with the rotor and an axial portion extending substantially parallel with the axis of the rotor, a magnetic field created by the electrical signals induced in the plurality of conductors affecting the magnets so as to cause the rotor to rotate about its axis, thereby transforming the electrical energy into rotational mechanical energy.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying Figures, in which:

FIG. 1B is an end view of an electrical generator in accordance with one embodiment of the present disclosure.

FIG. 3 is an end view of a rotator with an interrupter ring, in accordance with one embodiment of the present disclosure.

FIGS. 4A-C are side views of electrical generators in accordance with various embodiments of the present disclosure.

FIG. 5 is FIG. 2 a side view of a means for repositioning and/or realigning conductors in accordance with one embodiment of the present disclosure.

DETAILED DESCRIPTION

The present disclosure relates to novel and advantageous brushless DC electrical generators and motors. Particularly, the present disclosure relates to apparatus and methods for energy conversion devices for generating direct current ("DC") electrical signals (including alternating current ("AC") from DC signals) from a mechanical energy input (e.g., generators), without the use of brushes or other mechanical commutators, and to apparatus and methods for energy conversion devices for generating mechanical energy from an AC or DC electrical input (e.g., motors).

As described in U.S. Pat. No. 7,582,998, issued Sep. 1, 2009, which is hereby incorporated herein by reference in its entirety, the need for a mechanical rectifier may be eliminated by fixedly positioning a stationary conductor within a mechanically rotated magnetic field. More particularly, a pair of opposed, rotatable rotors, each carrying a plurality of bar magnets, may be mechanically rotated about an axis of rotation. Alternatively, a stationary conductor may be positioned within a magnetic field that is interrupted by rotatable rotors, each carrying a plurality of pieces of steel, or the like. An electrically conducting wire may extend through the axis of rotation and radially outwardly therefrom between the rotating rotors. A DC electrical signal may be thereby generated in the conductor, without the need for a mechanical commutator. The present disclosure provides improvements and/or alternatives to the various embodiments disclosed in U.S. Pat. No. 7,582,998.

Figure 1A:
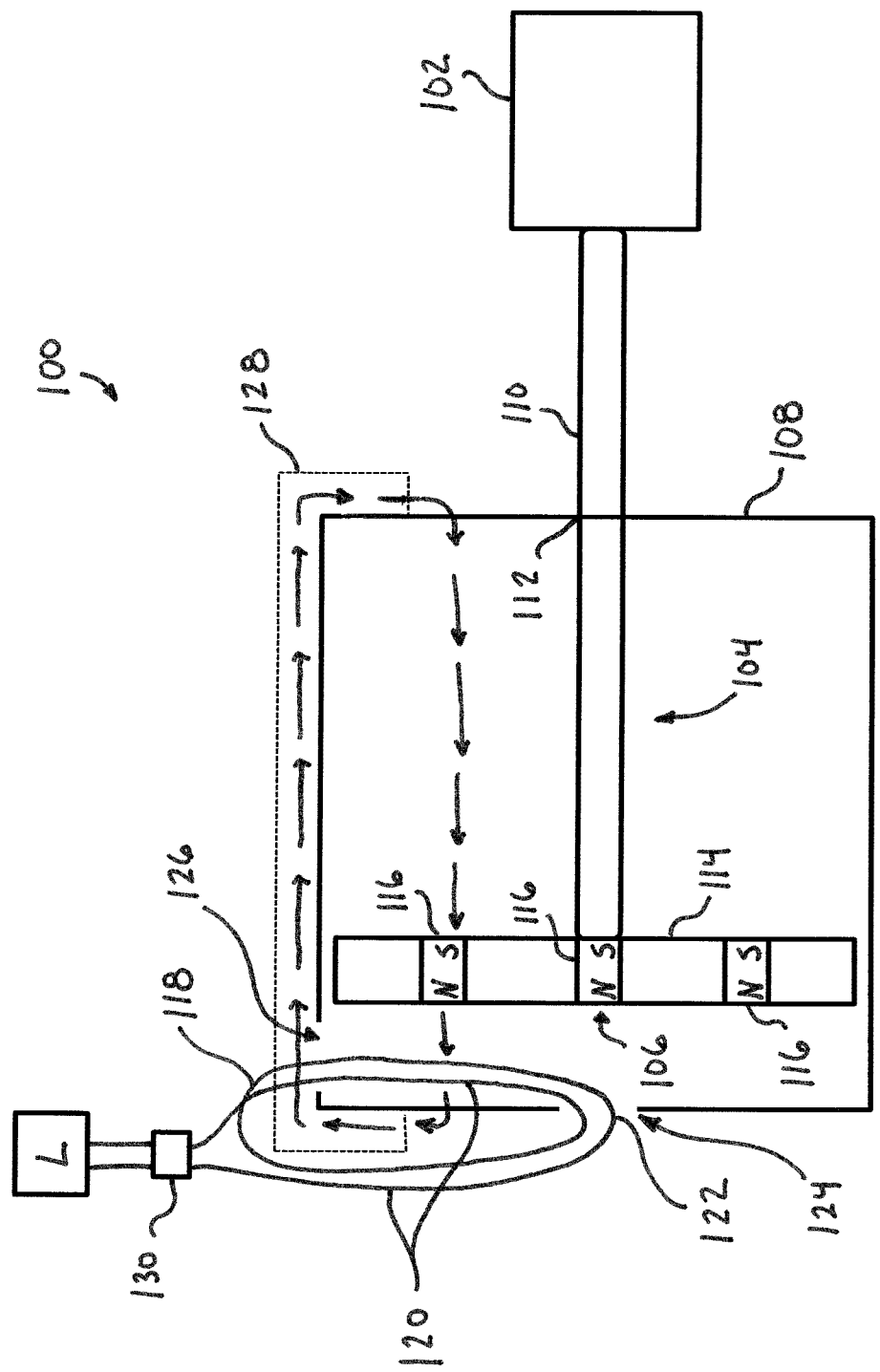
FIG. 1A is a side view of an electrical generator in accordance with one embodiment of the present disclosure.

With reference to FIGS. 1A and B, an electrical generator 100 in accordance with the present disclosure may generally include an external energy source 102, a rotating assembly 104, a signal presenting, electrical conductor 118, and optionally, a case 108. In one embodiment, the energy source 102 may be an electric motor, as illustrated in FIGS. 1A and B. In additional or alternative embodiments, however, the energy source 102 may be any other suitable rotating energy source, such as but not limited to, a manual crank, a water powered rotating shaft, a wind powered rotating shaft, or any combination thereof. The energy source 102 may transfer rotational mechanical energy to a common central shaft 110.

In one embodiment, the rotating assembly 104 may be attached or integral with the central shaft 110, or may include at least one rotatable shaft that is operably and/or mechanically connected, such as by belt, chain, linking mechanism, or any other suitable connecting means, with the central shaft 110, such that rotation of the central shaft transfers to rotation of the rotating assembly.

The central shaft 110 or other shaft operably connected therewith may be rotatably supported or mounted with respect to the case 108 via one or more bearing mounts 112. The central shaft 110 or other shaft operably connected therewith may be any suitable length and have any suitable size diameter, each of which may often depend on the application of the electrical generator 100. The central shaft 110 or other shaft operably connected therewith may be solid or tubular, and in the case of tubular, may have any size inner cylindrical diameter.

The rotating assembly 104 may include a rotor 114 fixably carried at or near the end 106 of the central shaft 110. As similarly discussed in U.S. Pat. No. 7,582,998, the rotor 114 may support one or more circumferentially spaced apart bar magnets 116. The number of circumferentially spaced apart bar magnets 116 may be selected based on any suitable number of factors, including desired output (as will be described in further detail below), cost, weight, the intended application, or any other suitable characteristic or combination or characteristics, or even randomly. In one embodiment, the rotor 114 may include two or more equiangularly, circumferentially spaced apart bar magnets 116. That is, each of the magnets 116 may be carried by the rotor 114 at a common radius from the axis of rotation defined by the central shaft 110. The magnetic fields of each of the magnets 116 may each be aligned and parallel, and generally oriented in the same direction. In one embodiment, the rotor 114 may be nonmagnetic or made from a material of substantially low or no magnetic permeability. Similarly, any means for attaching the magnets 116 to, or supporting the magnets from, the rotor 114 may be nonmagnetic or made from a material of substantially low or no magnetic permeability.

As described in U.S. Pat. No. 7,582,998, additional or alternative embodiments of an electrical generator 100 in accordance with the present disclosure may include one or more additional rotating assemblies, similar to that described above, and which may each similarly support one or more circumferentially or equiangularly, circumferentially spaced apart bar magnets. The rotating assemblies may each carry the same or similar number of magnets, and in some embodiments, the magnetic field of each of the bar magnets carried by the rotating assemblies may be aligned with, and oriented in the same direction as, the magnetic field of a respective bar magnet carried by rotor 114 or another rotating assembly, to provide a plurality of individually aligned, north/south magnetic field pairs, that collectively define a generally uniform, circumferentially distributed magnetic field. While such embodiments are considered within the scope of the present disclosure, such embodiments are not limiting to the present disclosure, which is intended to focus on the improvements to such systems as that described in U.S. Pat. No. 7,582,998. Generally, the number of rotors or rotating assemblies used may depend on the application for which the electrical generator 100 is intended and/or the size, shape, and power requirements for the application.

The electric generator 100 may include one or more electrical conductors 118, such as electrical conducting wires, electrical conducting wire coils, etc. The electric generator 100 may also include means for fixably positioning a portion of each electrical conductor 118, adjacent or nearly adjacent to the rotor 114. As described in U.S. Pat. No. 7,582,998, in one embodiment, a frame, hanger(s), or even tension of the conductor, may be utilized as means to fixedly support a portion of an electrical conductor adjacent or nearly adjacent to the rotor 114. In such embodiments, one or more electrical conductors may be supported by the means for fixably positioning such that a portion of each electrical conductor includes an axial portion received by and running through a tubular channel of the central shaft 110 along the axis of rotation defined by the shaft. Each conductor may also include an integral, radially extending portion, supported by the means for fixably positioning, extending radially outwardly from the axis of rotation of the central shaft 110 to a point extending beyond the radius defined by the aforementioned bar magnets.

In alternative embodiments, however, it need not be necessary that the axial portion of each of the one or more conductors run through a tubular channel of the central shaft 110. Rather, in some embodiments, as illustrated in FIGS. 1A and B, each conductor 118, such as a conducting wire coil, may utilize the case 108 as the means for fixably positioning the conductor appropriately. For example, a conductor 118 may have a portion 120 that extends radially outwardly from the axis of rotation of the central shaft 110 to a point extending beyond the radius defined by the aforementioned bar magnets 116. An axial portion 122 of the conductor 118 may then exit the case 108 through opening 124, aligned substantially with the axis of rotation of the central shaft 110. The case 108 may also include an opening 126 where the radial portion 120 of the conductor 118 may exit the case 108. In one embodiment, therefore, the conductor 118 may wrap around the case any suitable number of times between the two openings 124, 126 forming a coil at one end of the case, and adjacent or nearly adjacent to the rotor 114. Although illustrated in FIGS. 1A and B as being positioned at an end of the case 108, the conductor(s) 118 may be positioned along any axial position of the case and need not be positioned at an end. In such embodiments, any suitable means for fixably positioning, such as but not limited to, a frame, hanger(s), or even tension of the conductors, a portion of each electrical conductor 118 adjacent or nearly adjacent to the rotor 114 may be utilized, such as illustrated for example in FIGS. 4A and 5.

As illustrated in FIG. 1B, in embodiments having two or more conductors 118, the conductors may be arranged in an array. That is, the electrical conductors 118 may be arranged such that a plurality of individual radial portions 120*a*, 120*b*, 120*c*, 120*d*, 120*e* are spaced circumferentially about the case 108. The electrical conductors 118 may be spaced circumferentially about the case 108 in equally spaced distances, unequally spaced distances, randomly spaced distances, or at any other suitable spacing. While five conductors 118 are illustrated in FIG. 1B, it is recognized that any suitable number of conductors, arranged in an array, may be utilized, including fewer or greater than five. In some embodiments, the number of conductors 118 selected and/or used may depend on any suitable number of factors, including desired output (as will be described in further detail below), cost, weight, the intended application, or any other suitable characteristic or combination or characteristics, or even randomly.

With reference back to FIG. 1A, each conductor 118 may include an external electrical connection with an electrical load L. In further embodiments, however, any set or subset of conductors 118 may be connected in series or in parallel, as is understood in the art, and connected to one or more electrical loads L.

In some embodiments, the case 108 may be manufactured from a magnetic material, and thus the magnetic flux of the magnetic field(s) created by the bar magnets 116 may tend to travel through the case 108, as illustrated in FIG. 1A. In another embodiment, the case 108 may include a magnetic conductor 128 (illustrated in dashed line) extending along at least a portion of the case, so as to increase the tendency of the magnetic flux to travel along the case. In such embodiments, the case 108 may not be magnetic itself, and instead could be manufactured from a nonmagnetic material, such as but not limited to, plastic.

In operation, the energy source 102 may be rotated or otherwise energized, and may transfer rotational mechanical energy to the common central shaft 110, either directly or via other suitable linking mechanisms, as described above. The central shaft 110 may accordingly rotate rotor 114, and thus the circumferentially spaced apart bar magnets 116. As discussed above, each bar magnet 116 carried by the rotor 114 presents a magnetic field. Rotation of the central shaft 114 may cause the magnetic field presented by each bar magnet 116 to rotate, while the radial portions 120 of the electrical conductors 118 are held stationary adjacent or nearly adjacent to the rotating rotor 114. The rotating magnetic field created by each bar magnet 116 may thus continuously cut across, or pass across, the radial portions 120 of the conductors 118 in a uniform direction. As a result, a direct current electrical signal may be thereby created in each of the conductors 118 and presented to the load L.

Figure 2:
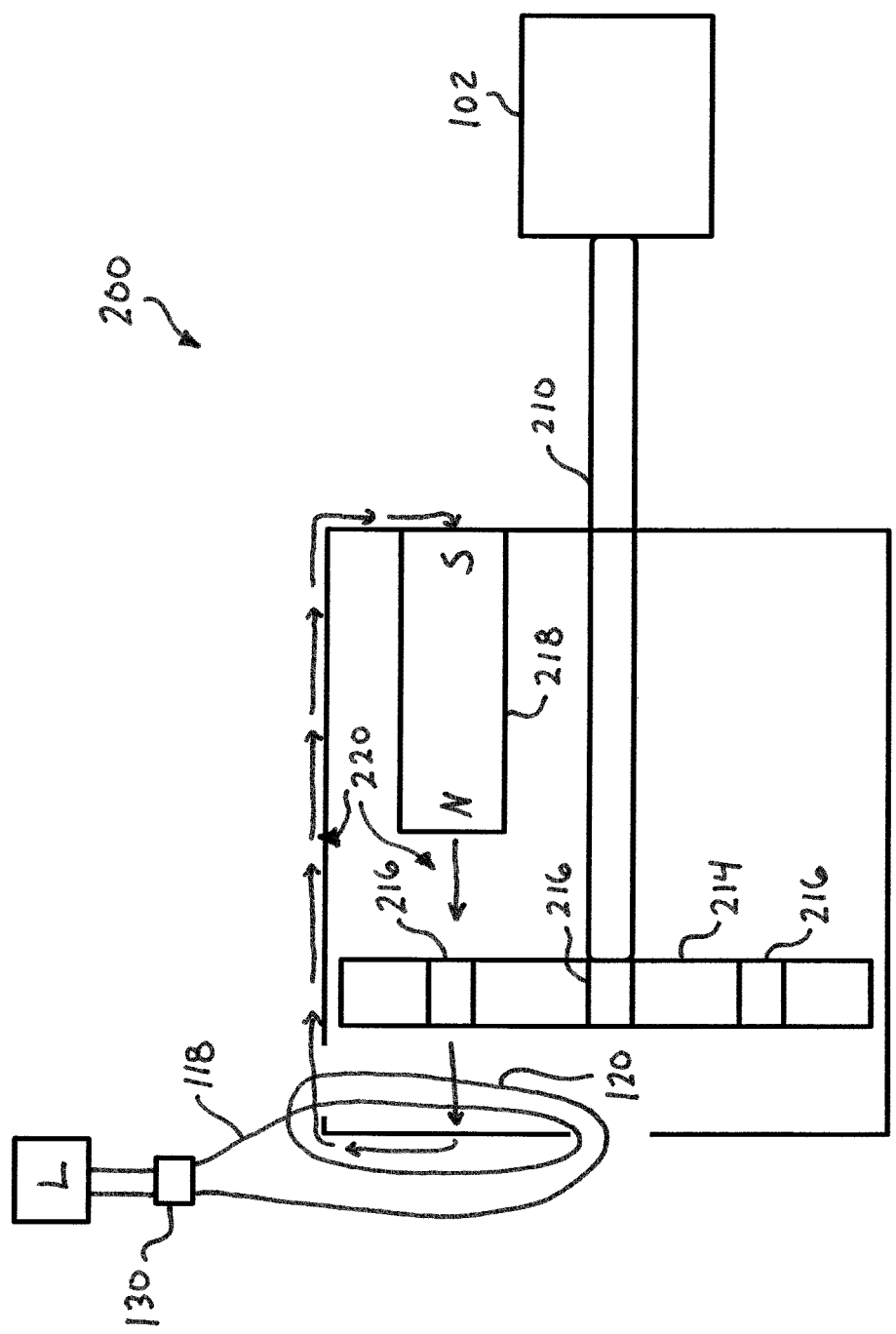
FIG. 2 a side view of an electrical generator in accordance with another embodiment of the present disclosure.

In other embodiments, rather than utilizing bar magnets 116, a rotor 214 of an electrical generator 200 in accordance with the present disclosure may utilize one or more magnetic field interrupters 216, as illustrated in FIG. 2. Particularly, in one embodiment, the rotor 214 may support one or more circumferentially spaced apart magnetic field interrupters 216. The magnetic field interrupters 216 may be manufactured from any suitable magnetically permeable material, such as but not limited to steel or iron, that may tend to modify a magnetic field in which it is placed. For example, soft iron is powerfully magnetized by induction, merely by placing it near to or in contact with a permanent magnet, electromagnet, or other magnet device. Soft iron, however, will lose almost all of its magnetism when the inducing magnet device is withdrawn, or the soft iron is otherwise moved away from the inducing magnetic device, making soft iron advantageously useful in the present embodiments. The presence of a piece of soft iron in a magnetic field has the effect of distorting the magnetic field, the magnetic flux tending to pass through the soft iron rather than the surrounding air on account of the greater magnetic permeability of the iron. That is, if a piece of soft iron is placed in a strong magnetic field between two poles, the magnetic flux will crowd together so as to pass in relatively larger quantity along the soft iron piece; in this regard, the soft iron acts as a concentration point for the magnetic energy. The number of circumferentially spaced apart interrupters 216 may be selected based on any suitable number of factors, including desired output (as will be described in further detail below), cost, weight, the intended application, or any other suitable characteristic or combination or characteristics, or even randomly. In one embodiment, the rotor 214 may include two or more equiangularly, circumferentially spaced apart interrupters 216. That is, each of the interrupters 216 may be carried by the rotor 214 at a common radius from the axis of rotation defined by the central shaft 210. In yet another embodiment, the spaced apart interrupters 216 may instead be replaced with a complete interrupter ring 230, as shown in FIG. 3, such as a complete ring of soft iron. In further embodiments, a plurality of interrupter rings 230 at various circumferential distances from the axis of rotation of the rotor 214 may be provided on the rotor 214. In one embodiment, the rotor 114 may be nonmagnetic or made from a material of substantially low or no magnetic permeability. Similarly, any means for attaching the interrupters 216 to, or supporting the interrupters from, the rotor 214 may be nonmagnetic or made from a material of substantially low or no magnetic permeability.

In such embodiments, one or more magnetic fields can be provided by one or more suitably positioned magnets 218, as illustrated for example, in FIG. 2. Magnet(s) 218 may be any suitable magnet(s), including but not limited to, permanent magnets, electromagnets, or combinations thereof. As illustrated for example in FIG. 2, magnet 218 may provide a magnetic field 220 generally extending from the magnet through the rotor 214, through a radial portion 120 of an electrical conductor 118, and around the case back to the magnet. While magnet 218 is illustrated as positioned within the case 108, the positioning of the magnet is not so limited. For example, the magnet 108 may be positioned on an interior side of the case or on an exterior side of the case, similar to that of magnetic conductor 128 illustrated in FIG. 1. Other magnet configuration examples are discussed and illustrated in detail below.

Additionally, as similarly described above with respect to generator 100, additional or alternative embodiments of an electrical generator 200 in accordance with the present disclosure may include one or more additional rotating assemblies, which may each similarly support one or more circumferentially or equiangularly, circumferentially spaced apart interrupters. The rotating assemblies may each carry the same or similar number of interrupters or a different number of interruptors. Each rotating assembly may be aligned with the same set of conductors as one or more of the other rotating assemblies, or may be aligned with its own set of conductors, as desired. Generally, the number of rotors or rotating assemblies and sets of conductors used may depend on the application for which the electrical generator 200 is intended and/or the size, shape, and power requirements for the application.

In operation, the energy source 102 may be rotated or otherwise energized, and may transfer rotational mechanical energy to the common central shaft 210, either directly or via other suitable linking mechanisms, as described above. The central shaft 210 may accordingly rotate rotor 214, and thus the circumferentially spaced apart interrupters 216. Rotation of the central shaft 214 may cause the interrupters 216 to rotate, while the radial portions 120 of the electrical conductors 118 are held stationary adjacent or nearly adjacent to the rotating rotor 214. A magnet field 220 is provided by magnet 218, which as disclosed herein, may be any suitable magnet, including but not limited to, one or more permanent magnets, electromagnets, or combinations thereof. As each interrupter 216 passes through the magnetic field 220, as discussed above, the presence of the interrupter in the magnetic field has the effect of distorting the magnetic field, the magnetic flux tending to pass through the interruptor rather than the surrounding air on account of the greater magnetic permeability of the iron. The substantially constantly distorting magnetic field created by the magnet 218 and rotating interrupters 216 may thus continuously cut across, or pass across, the radial portions 120 of the conductors 118 in a uniform direction. As a result, a direct current electrical signal may be thereby created in each of the conductors 118 and presented to the load L.

While illustrated in FIG. 2 with a single magnet 218, a generator of the present disclosure could of course utilize any suitable number of magnets 218. For example, in one embodiment, any suitable number of magnets 218 may be provided such that a sufficient magnetic field is created in which the one or more interrupters 216 sufficiently distort or concentrate the magnetic field as they pass adjacent or nearly adjacent each of the one or more conductors 118. Similarly, various magnet 218 configurations/placement may be utilized, and in some embodiments, may depend on any suitable number of factors, including desired output (as will be described in further detail below), cost, weight, the intended application, or any other suitable characteristic or combination or characteristics, or even randomly determined.

For example, with reference to FIG. 4A, two magnets 418 may be provided, and positioned such that they are substantially aligned linearly and magnetically oriented in substantially the same direction, and spaced from one another to form a gap 402 therebetween. In this regard, the magnetic field formed by the magnets 418 may generally extend from a first one of the magnets, through the gap 402 between the magnets, through the second one of the magnets, and around the case 408 back to the first of the magnets. A rotor 414, similar to rotor 214 described above, may be positioned such that circumferentially spaced apart interrupters 416 may pass through the gap 402 between magnets 418 upon rotation of the rotor 414. Conductors 118 may be positioned adjacent or nearly adjacent to rotor 414, as described above, and in some embodiments, may be so positioned by any suitable means for fixably positioning each electrical conductor 118 as described herein. For example, as illustrated in FIG. 4A, a frame 404 of suitable material, such as plastic, may be provided to support the conductors 118.

Figure 4B:
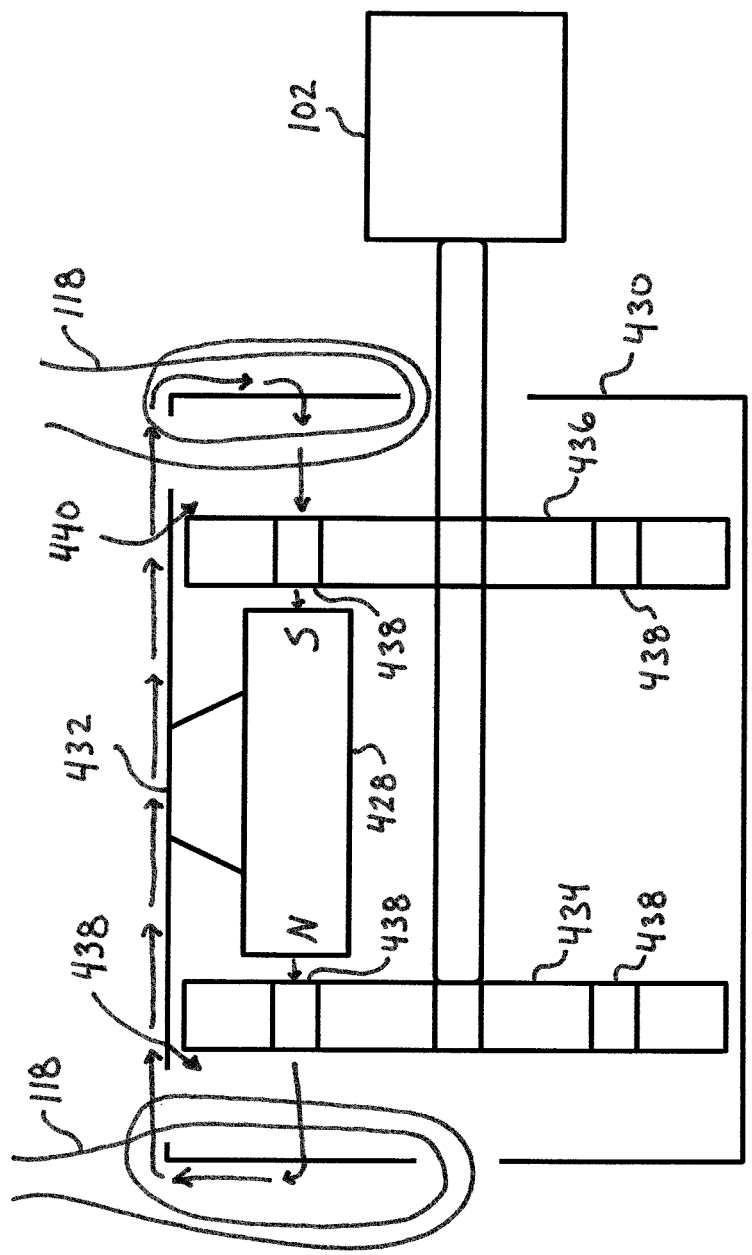

The magnets 218, 418 may be integral with, or mounted directly to, a case 408. However, in other embodiments, it may be desirable that the magnets are not directly connected with the case, and as such the magnets may be indirectly connected with the case via a support mount. For example, as illustrated in FIG. 4B, a magnet 428 may be provided within a case 430 and oriented such that there is a gap between each of its poles and the sides or ends of the case 430. The magnet 428 may be non-magnetically connected to the case via a support mount 432. In this regard, the so-positioned magnet 428 may create two separate gap areas 438, 440 suitable for positioning a rotor 434, 436, each having one or more interrupters 438, and one or more conductors 118. As previously described, the conductors 118 may be positioned adjacent or nearly adjacent to a respective rotor 434,436, and in some embodiments, may be so positioned by any suitable means for fixably positioning each electrical conductor 118 such as via a frame of suitable material, such as plastic. A magnetic field thus formed by the magnet 428 may generally extend from a first pole of the magnet, through a first gap 438 between the magnet and the case, in which for example a rotor 434 and corresponding conductors 118 may be positioned, then around the case 430 from one end to the other, through a second gap 440, in which for example another rotor 436 and corresponding conductors 118 may be positioned, to a second pole of the magnet.

In yet another example variation, similar to the above embodiment of FIG. 4B, a first magnet 450 may be provided within a case 452 and oriented such that there is a gap between a first one of its poles and the side or end of the case, and a second magnet 454 may be provided within the case 452 and similarly oriented such that there is a gap between a first one of its poles and the side or end of the case. The magnets 450 and 454 may also be positioned such that they are substantially aligned linearly and spaced from one another to form a gap therebetween. However, as an example, the magnets 450 and 454 may be magnetically oriented in substantially opposite directions, thereby forming magnetic fields of different orientation. The magnets 450 and 454 may each be magnetically connected to the case via a magnetic support mount 456. In this regard, the so-positioned magnets 450 and 454 may create two separate gap areas 464, 468 suitable for positioning a rotor 458, 460, each having one or more interrupters 462, and one or more conductors 118. As previously described, the conductors 118 may be positioned adjacent or nearly adjacent to a respective rotor 458,460, and in some embodiments, may be so positioned by any suitable means for fixably positioning each electrical conductor 118 such as via a frame of suitable material, such as plastic. A magnetic field thus formed by the first magnet 450 may generally extend from a first pole of the magnet, through a first gap 464 between the magnet and the case, in which for example a rotor 458 and corresponding conductors 118 may be positioned, then around a first portion or length of the case 452 from one end to the magnetic mount 456 of the first magnet, and back to a second pole of the magnet. Similarly, a magnetic field thus formed by the second magnet 454 may generally extend from a first pole of the magnet, through a second gap 468 between the magnet and the case, in which for example a rotor 460 and corresponding conductors 118 may be positioned, then around a second portion or length of the case 452 from one end to the magnetic mount 456 of the second magnet, and back to a second pole of the magnet. In this regard, as noted above, magnetic fields of substantially opposite orientation may be created in gaps 464 and 468, and thus may be utilized to readily create, as an example, DC output in the conductors of one gap and inverse DC output in the conductors of the other gap without the need for altering other portions of the generator. Of course, such embodiment has other utility than to merely create DC and inverse DC, and such is just an example.

With any of the embodiments described herein, any suitable number of additional magnets may be utilized and spaced circumferentially about the rotating assembly or central shaft of the generator, and any of the magnets may be oriented with its poles reversed from any one of the other magnets to obtain a variety of desired outputs at the conductors 118, as will be discussed in more detail below. For example, in one embodiment, a plurality of magnets may be spaced circumferentially about the rotating assembly of the generator, with every other magnet oriented in the same magnetic direction, thus alternatingly producing DC current and inverse DC current, and thus an AC output signal based on DC signals.

As alluded to above, a variety of output currents/waveforms may be achieved utilizing the various embodiments of generators of the present disclosure. More specifically, the various embodiments of generators of the present disclosure enable DC output signals, inverse DC output signals, AC output signals based on DC and inverse DC signals, two-phase or three-phase DC or AC output signals, or any other suitable output waveforms based on DC and/or inverse DC signals.

The generation of DC output signals has been described above. In further embodiments, as discussed above, any suitable number of magnets and/or any suitable number of conductors 118 may be provided to create more than one output DC electrical signal. Any of the output DC electrical signals may be utilized as-is or may be modified, such as to inverse DC. Inverse DC output signals can be achieved in a variety of manners. For example, as described in some embodiments above, the poles of any given magnet of the generator may simply be reversed, resulting in an inverted DC electrical signal in a conductor 118 correspondingly aligned with that magnet. In additional or alternative embodiments, the ends or leads of a conductor coil may be transposed or interchanged, in effect providing the load with an inverted DC signal. In one particular embodiment, as illustrated in FIG. 1A, one or more switches 130 may be operably connected with one or more of the conductors and can be operated to switch the leads of the conductors, jointly or individually, at will in order to supply the load with DC signals or inverted DC signals, at any given time. Specifically, one or more switches 130 may be utilized to mechanically or electrically transpose the leads of the conductors, jointly or individually, as desired. Similarly, as discussed above, any of the conductors may be connected in series of parallel. As illustrated for example in FIG. 1B, one or more switches 132 may also be used to connect and disconnect one or more conductors into and out of connection with one or more other conductors as well as to connect and disconnect multiple conductors between series and parallel connections, as desired. Similarly, the switches 130, 132 may be simply used to turn on/off conductors, jointly or separately, or otherwise connect and disconnect conductors, jointly or separately, from the loads, as desired. The switches 130, 132 may additionally or alternatively be used to connect and disconnect one or more loads L into and out of connection with one or more other conductors as well as to connect and disconnect multiple loads L between series and parallel connections with the conductors, as desired. In this regard, in example embodiments having a plurality of spaced conductors, as shown for example in FIG. 1B, the switches 130, 132 could provide numerous varieties of output possibilities, where the conductors and their connections with one another and with the loads can be varied at any time, as desired, to obtain a desired output.

In additional or alternative embodiments, as illustrated in FIG. 5, a means for repositioning and/or realigning 500 the conductors 118 may be provided in order to readily and relatively easily reposition and configure the conductors to obtain a desired output signal(s) or waveform(s). In one embodiment, the means for repositioning and/or realigning 500 may include means for repositioning the conductors or conductor coils relative to one another and/or means for realigning the conductors or conductor coils relative the rotor, magnet(s), interrupter(s), and/or magnetic field(s) described in detail above. In one embodiment, as illustrated in FIG. 5, the means for repositioning and/or realigning 500 the conductors 118 may include a frame having a base 502 and a conductor support 504 rotatably connected with the base 502, such that the conductor support may rotate about a central axis 506 thereof. The conductor support 504 may be rotatably connected to the base 502 via any suitable means, such as but not limited to via one or more bearings, as will be understood in the art. The base 502 may be fixedly positioned within the case or otherwise such that the conductor support 504 is adjacent or nearly adjacent to a rotor, as described in detail above. The conductor support 504 may support one or more conductors 118 or conductor coils, which, in one embodiment, each may generally wrap radially around the conductor support between an outer circumferential edge 508 of the conductor support and a central opening 510. The conductors 118 may be wrapped, or otherwise operably connected, in such a manner that the conductors are permitted to move, slide, or otherwise be repositioned radially about the axis defined by the central opening 510. In one embodiment, the conductor support 504 may include or be operably connectable with one or more fasteners 512 for slidingly fastening the conductors 118 with the conductor support. The fasteners 512 may be operably, and in some cases removably, connected with the conductors 118 and may be jointly or separately slid or moved to reposition the conductors 118 radially about the axis of the conductor support 504 defined by the central opening 510. In this regard, conductors 118 may be spaced circumferentially about conductor support 504 in any desired spacing pattern, including at regular spacing, irregular spacing, or even random spacing, and such spacing may depend on the desired output signal(s) or waveform(s). The conductor support 504 may additionally or alternatively be rotatably repositioned about its central axis 506, such that the conductors 118 or conductor coils may be jointly repositioned relative the rotor, magnet(s), interrupter(s), and/or magnetic field(s) described in detail above while maintaining the relative circumferential spacing of the conductors to one another. While various means for rotating the conductor support 504 are available and considered within the present disclosure, in one embodiment, the conductor support may include a plurality of gears or teeth 514 around the circumferential edge 508, which may cooperate with a worm gear 516, for example, to rotate the conductor support upon rotation or activation of the worm gear. While the means for repositioning and/or realigning 500 the conductors 118 is illustrated as mechanical in nature (e.g., fasteners 512, teeth 514, and worm gear 516), it is recognized that the means for repositioning and/or realigning 500 could additionally or alternatively utilize hydraulic and/or pneumatic systems, electro-mechanical systems, or the like to control the placement of the conductors.

In any of the various embodiments disclosed herein, the one or more magnets, one or more interrupters, one or more conductors, one or more switches, and/or the means for repositioning and/or realigning the conductors need not be oriented nor configured to present the same output signal to the one or more loads, and in some embodiments, the one or more magnets, one or more interrupters, one or more conductors, one or more switches, and/or the means for repositioning and/or realigning the conductors may be configured such that the output signal of a given conductor or a combination of output signals from a plurality of conductors may be utilized to present a desired output/waveform to any given load. For example, as briefly mentioned above, the magnets, conductors, and/or switches may be configured such that a combination of DC and inverse DC signals are utilized to present an AC output/waveform to a load. In even further embodiments, the magnets, conductors, and/or switches may be configured to present two-phase or three-phase DC or AC output signals. Similarly, any of the various embodiments of generators described herein may be configured to provide a plurality of simultaneous signals, including signals of the same or different waveforms. Of course any selected or random pattern of signals may be achieved utilizing the various embodiments and configurations disclosed herein and need not be limited to those provided as examples. In general, as will be recognized by those skilled in the art, any assortment of suitable energy outputs may be produced for different applications, and any suitable number of magnets and/or conductors may be provided to produce such a desired energy output, including a combination of normal and inverted DC electrical signals.

While described generally herein with respect to energy conversion devices for generating DC electrical signals (or various waveforms based on DC electrical signals, as discussed above) from a mechanical energy input, or otherwise often referred to as a generator, the various embodiments of the present disclosure could easily be configured for generally reverse operation, wherein mechanical energy is created from an electrical input, otherwise often referred to as a motor. Specifically, in a generally reverse operation, conductors 118 may be utilized to sequentially create a rotating magnetic field which may attract or repel bar magnets 116, and cause the bar magnets to rotate with the rotating magnetic field. The rotating bar magnetics 116 would correspondingly cause rotation of rotor 114 and central shaft 110, which could then be utilized as an output shaft, as would be understood by those skilled in the art. The output shaft 110 could be configured to provide rotational mechanical motion for any suitable intended application, as desired. Any of the various applicable features described above, such as but not limited to, the means for repositioning and/or realigning the conductors, may similarly be used in a motor embodiment.

Although the present invention has been described with reference to preferred embodiments, persons skilled in the art will recognize that changes may be made in form and detail without departing from the spirit and scope of the invention. For example, it is recognized that an electrical generator of the present disclosure can and may be adapted, configured, or designed for any type of suitable application. For example, as previously described, an electrical generator may have more than one magnet or electromagnet, oriented in like manner or not, a single or multiple rotors may be used, and/or a conductor coil, conductor coil(s), in series or parallel, and/or conductor array may be used, etc. In addition, the dimensions, shape, and configuration may all be adapted for any suitable application and power requirements.

I claim:

1. An apparatus for the generation of a unidirectional electrical signal, comprising:
   at least one magnet defining a magnetic field;
   a rotor disc of substantially no magnetic permeability comprising at least one magnetic field interrupter of magnetically permeable material positioned at a first radial distance from a center axis of the rotor disc, the rotor positioned so as to, upon rotation of the rotor disc, cause the at least one magnetic field interrupter to pass through the magnetic field; and
   a support frame supporting an electrical conductor extending across the magnetic field, whereby as the at least one interrupter passes through the magnetic field, the magnetic field is distorted by the interrupter thereby inducing a unidirectional electric signal in the conductor;
   wherein the electrical conductor is operably repositionable about a central axis of the support frame via a fastener operably connected with the conductor and the support frame, the fastener moveable about the central axis of the support frame, such that the conductor moves along with the fastener as the fastener moves about the central axis of the support frame.

2. The apparatus of claim 1, wherein the at least one magnet comprises an electromagnet.

3. The apparatus of claim 2, wherein the rotor disc comprises a plurality of equiangularly, circumferentially spaced apart magnetic field interrupters.

4. The apparatus of claim 3, wherein the magnetic field interrupters are each oriented at a common radius from the center axis.

5. The apparatus of claim 1, wherein the at least one magnet comprises a permanent magnet.

6. The apparatus of claim 1, wherein the at least one magnetic field interrupter comprises soft iron.

7. The apparatus of claim 1, further comprising a plurality of conductors, each extending across the magnetic field, whereby as the at least one magnetic field interrupter passes through the magnetic field, the magnetic field is distorted by the magnetic field interrupter in the area near the magnetic field interrupter thereby inducing a unidirectional electric signal in the conductors.

8. The apparatus of claim 7, wherein each conductor comprises a first and second lead operably connectable to a load, and further comprising at least one switch for at least one of operably connecting and disconnecting at least a subset of the conductors from a load and operably transposing connections the first and second leads of at least a subset of the conductors with a load.

9. The apparatus of claim 7, further comprising at least one switch for at least one of operably connecting and disconnecting at least a subset of the conductors in series and operably connecting and disconnecting at least a subset of the conductors in parallel.

10. The apparatus of claim 7, wherein the plurality of conductors are arranged such that the unidirectional electric signals in the conductors are combined to create an alternating current.

11. The apparatus of claim 7, wherein the plurality of conductors are arranged such that the unidirectional electric signals in the conductors create a three-phase DC signal.

12. The apparatus of claim 8, wherein the at least one switch is operated such that the leads of at least one the conductors supply the load with a DC signal and the leads of at least one other of the conductors supply the load with an inverse DC signal.

13. The apparatus of claim 8, wherein the plurality of conductors are arranged and the at least one switch is operated such that the conductors supply the load with a three-phase AC signal.

14. The apparatus of claim 1, wherein the fastener is slidingly connected with the support frame.

15. An apparatus for the generation of a unidirectional electrical signal, comprising:
  at least one magnet defining a magnetic field;
  a rotor disc of substantially no magnetic permeability comprising at least one magnetic field interrupter of magnetically permeable material positioned at a first radial distance from a center axis of the rotor disc, the rotor positioned so as to, upon rotation of the rotor disc, cause the at least one magnetic field interrupter to pass through the magnetic field; and
  a support frame supporting an electrical conductor extending across the magnetic field, whereby as the at least one interrupter passes through the magnetic field, the magnetic field is distorted by the interrupter thereby inducing a unidirectional electric signal in the conductor;
  wherein the support frame is rotatable about a central axis thereof, and the electrical conductor is operably repositionable about a central axis of the support frame by rotation of the support frame about its central axis, such that the conductor moves along with the support frame as the support frame rotates about its central axis.

16. A method for creating mechanical output from an electrical signal, comprising:
  inducing an electrical signal through a conductor, the conductor extending near a rotor, the rotor being rotatable about an axis thereof and comprising a plurality of equiangularly, circumferentially spaced apart magnets, a magnetic field created by the electrical signal induced in the conductor affecting the magnets so as to cause the rotor to rotate about its axis, thereby transforming the electrical energy into rotational mechanical energy;
  wherein the conductor comprises a radial portion extending substantially parallel with the rotor and an axial portion extending generally collinear with the axis of the rotor.

17. The method of claim 16, further comprising inducing an electrical signal through a plurality of conductors, each comprising a radial portion extending substantially parallel with the rotor and an axial portion extending substantially parallel with the axis of the rotor, a magnetic field created by the electrical signals induced in the plurality of conductors affecting the magnets so as to cause the rotor to rotate about its axis, thereby transforming the electrical energy into rotational mechanical energy.

* * * * *